Patented June 8, 1943

2,321,400

UNITED STATES PATENT OFFICE 2,321,400

VITAMIN CONTAINING COMPOSITION AND METHOD OF MAKING THE SAME

George Henry Lubarsky, New York, N. Y., assignor, by mesne assignments, to Vitamol Company, New York, N. Y., a partnership composed of J. Ginzberg, A. G. Golodetz, and L. Eliash No Drawing. Application October 12, 1938, Serial No. 234,623

13 Claims. (Cl. 167—81)

This invention relates to vitamin compositions and more particularly to a composition in which oil-soluble vitamins are incorporated in a nutritive carrier and are substantially stabilized against deterioration and oxidation.

For feeding poultry and livestock vitamins A and D are found to be practically indispensable in securing the best results. Vitamin A is needed for normal growth and general well-being and vitamin D is needed to prevent rickets and to build strong bones and teeth. In poultry vitamin D is required to increase egg production, form strong egg shells and to enrich the eggs with vitamins. Dairy cows transfer vitamins A and D in their feed to the milk and to the butter produced therefrom.

It is a recognized fact that the best source of vitamins A and D is fish liver oils, such as cod, haddock, halibut, tuna and salmon liver oils. Vitamin D is obtained also by the irradiation of certain products such as cholesterol.

These fish liver oils are quite easily oxidizable and readily become rancid producing rapid deterioration of the vitamins which they contain.

This deterioration and loss of vitamin potency is particularly significant where the fish oil, whether it be straight cod liver oil, sardine oil or fish liver oil, is incorporated in a feed and the feed is thereupon exposed to air.

The oil soluble vitamins A and D as they occur, for example, in the fish liver oils are present in the nonsaponifiable fraction of those oils. Concentrates of these vitamins may be prepared by saponification, the non-saponifiable portion of these oils containing these vitamins in a high degree of potency.

By using the vitamin oil concentrates, the quantity of oil required for each ton of feed is considerably reduced. These vitamin concentrates, however, have the disadvantage that there is so little fluid associated with the vitamins that there is a difficulty of having the vitamin product well distributed throughout the feed.

Furthermore, where the vitamin oils are mixed with liquid feeds, such as with milk and other aqueous solutions, the oil comes to the top and often the animals refuse to drink the fluid with the objectional oil therein.

It is, therefore, an object of the present invention to provide a carrier in which a vitamin oil concentrate may be carried so that such vitamin product can be embodied in poultry and animal feeds in a condition to be readily assimilated by the poultry and animals.

Another object of the present invention is to provide a stable vitamin composition whereby the carrier which is used protects the vitamins against oxidation and deterioration. A still further object is to provide a carrier by which the vitamin content may be accurately measured to give any desired degree of potency.

Another object of this invention is to provide a vitamin composition which is palatable and readily digestible.

In accordance with the present invention, molasses and particularly blackstrap or centrifugal molasses is used as a carrier for the vitamin oil concentrates. This molasses is easily and readily digestible by animals because it contains various carbohydrates usually in the form of invert sugars, minerals, salts of various kinds including calcium, phosphorus, iron, copper, potassium, magnesium and the like, in combined form and also containing such substances as calcium gluconate and a relatively large amount of vitamin G.

The blackstrap molasses generally contains 50% to 60% digestible sugars, 8% of useful minerals (including sodium, potassium, calcium, phosphorus pentoxide, magnesium, iron, copper), 3% of organic substances, including amino acids, albuminoids, asparagin, ammonia and xanthin bodies, and about 5% of organic gums, including xylan, araban and pectin. These organic gums make molasses a natural emulsifying stabilizer.

The vitamin concentrate used with molasses is preferably a vitamin fraction which is separated from a fish liver oil, such as cod liver oil. The separation of the vitamin fraction is preferably carried out by the process of Marcus which is described in detail in The Journal of Biological Chemistry, vol. 80, pages 9 to 14, November, 1928. By this process the fatty acid glyceride or saponifiable portion is separated from the non-saponifiable portion. The non-saponifiable portion contains the vitamins A and D and constitutes only a small fraction by volume of the original oil.

In practising my invention, I provide a mixture of a vitamin A and D concentrate with a suitable amount of molasses and treat the same, preferably in two stages, in order to make a permanent combination. I usually provide a turbine mixer for the first stage of the operation. The turbine mixer which I prefer to use consists of a relatively deep vessel in the bottom of which there is placed a turbine in a horizontal position and operating on a vertical shaft. The turbine is so arranged that it draws in liquid from the bottom of the vessel and expels it towards the top. By such means I make a very rich preliminary mixture or emulsion of the vitamin concentrate and the molasses, the conditions being such that no air is drawn into the mass being agitated and the effect of the turbine by reason of its construction is to expel air from the mixture. This is of considerable importance as vitamin A is readily oxidizable and in agitating the same by ordinary methods, the air may destroy the vitamin A to a large extent.

In order to render the emulsion complete and permanent, I then subject the initial mixture to the action of a colloidal mill. This mill consists essentially of a stationary member and a closely fitting rotating member. The material to be emulsified is caused to flow between the two members and the distance between the same is adjusted to a proper amount so as to cause a shearing action on the particles of liquid being emulsified. By reason of the high speed rotation of the rotating member, namely, about 4,000 revolutions per minute, the shearing of the particles, the reduction of size thereof and the emulsification are completed effectively in a short time. In the colloidal mill, air is excluded so that there is no danger of oxidation of vitamin A.

Usually, the proportion of molasses to the vitamin concentrate is quite large so that the final emulsion is one of the concentrate in the molasses. The molasses is the continuous phase and the vitamin concentrate is the dispersed phase. Thereby, each small globule of the concentrate is surrounded by a thick, viscous film of molasses which acts to prevent the access of air and prevents deterioration or oxidation of vitamin A after the composition is completed.

The emulsification of the blackstrap or centrifugal molasses with the vitamin concentrate must be carefully carried out in order to produce a compound of a known potency. Blackstrap molasses has a varying gravity in accordance with the source of the raw materials and the process used in manufacture of the molasses. The blackstrap molasses suitable for the present process should not have a density less than 45° Beaumé at a temperature of 20° C. The density of the molasses is reduced to 41.5° Beaumé with water before the molasses is used for making the emulsion. This density of molasses has a viscosity which will permit the vitamin oil concentrate to be readily dispersed therein. The quantity of water required to reduce the density to 41.5° Beaumé is carefully measured and then to this mixture is added the exact quantity of high potency vitamin A and D which will give the desired potency in rat or chick units for which the product is to be used. In order to obtain the desired potency it is necessary that the vitamin oil concentrate potency shall have been accurately determined by bio-assays with either chicks or rats or both.

After the vitamin oil concentrate and molasses have been carefully emulsified, the mixture is placed in the hopper of a colloid homogenizing apparatus after it has been heated to a temperature of about 80° F. for the treatment. The homogenizer operates at a speed of about 3500 to 4000 R. P. M. and acts to break down the gums in the molasses and to break the oil particles into minute globules which occupy the dispersed phase of the colloid and which are completely surrounded and taken up in the molasses which is in the continuous phase. The homogenizing machine tends to form a more perfect emulsion of the vitamin oil and the molasses and the gums of the molasses tend to stabilize the emulsion so that it will be very permanent. All of the oil globules are completely surrounded by a molasses coating and the homogenizing operation is carried out in the absence of air so that no oxidation of the vitamin oil will take place during the homogenizing operation and after the emulsion has been formed. Preferably the homogenizing apparatus is cooled during the operation in order to prevent heating of the constituents which might tend to injure the vitamin product and also tend to break the emulsion. The minute globules of vitamin oil held by the molasses are protected from oxidation and the emulsion is so well stabilized that a product which has been made up for several years and allowed to stand does not show any change in vitamin content or in the size of the oil globules.

As an illustration of a composition made in accordance with the present invention, I may take a vitamin A and D concentrate of a potency of 35,000 units of vitamin D and 20,000 units of vitamin A per gram. To one pound of said concentrate there is added 87 pounds of blackstrap molasses and the mixture is emulsified as set forth above. The potency of the final mixture is about 400 units of vitamin D per gram.

From the above description, it will be seen that this invention provides a stable emulsion of molasses and vitamin oil concentrates which offers many advantages.

This molasses vitamin emulsion is a better and more stable anti-rachitic product, particularly for feeding to livestock and poultry. By using this emulsion there is also obtained a substantial increase in the weight of the poultry within a given period of time over other vitamin products which are now being used.

The saponifiable material which is present in most vitamin oil-soluble products may be eliminated in applicant's process.

The molasses in the emulsion described tends to coat and protect the vitamins against oxidation and deterioration, the vitamins occurring in the dispersed phase of the emulsion.

This molasses vitamin oil concentrate product is palatable and easily digested, and does not have any ill effects on the digestive systems of the animals or poultry which eat it.

The molasses as a carrier when emulsified with the oil-soluble vitamins provides a product which may be mixed with aqueous fluids, such as milk, for feeds for animals and poultry and this material does not separate out from the milk or other aqueous fluids. Moreover, it blends and mixes with foods. Accordingly the mixture is palatable and is readily eaten by the chicks and animals in contra-distinction to the manner in which milk or other fluids are rejected by chicks and animals when the vitamin oil accumulates on the surface thereof. Furthermore, the molasses-vitamin oil product does not change or affect the flavor of the feeds.

The vitamin oil is very finely dispersed and uniformly mixed in the molasses. The molasses is diluted with water to the degree that it may be readily mixed with the feeds so that it can be uniformly distributed throughout the feed. In this way feeds can be prepared to give a uniform result in the feeding of animals and poultry. The molasses carrier for the concentrated vitamin oils places the vitamins in a condition that they may be readily assimilated by animals and poultry, and that the full effectiveness of the vitamin oils may be obtained when used for feeding purposes.

This application is a continuation in part of my pending application, Serial No. 166,579, filed September 30, 1937, for Vitamin containing composition and method of making the same.

The preferred form of the invention having been thus described what is claimed as new is:

1. A vitamin composition comprising molasses and a fish liver oil concentrate containing vitamins, the composition being in the form of a permanent emulsion containing said concentrate as minute globules in the dispersed phase.

2. An admixture for feeds comprising blackstrap molasses and a fish liver oil vitamin concentrate, the composition being in the form of a permanent emulsion containing the concentrate as fine globules constituting the dispersed phase.

3. A composition such as described in claim 1 wherein the molasses is a blackstrap molasses and the potency of the composition is of the order of approximately 400 vitamin D chick units for each gram of the composition.

4. The composition as described in claim 2 in which the gravity of the molasses of the emulsion is 41.5° Beaumé.

5. An admixture for poultry feeds comprising a stabilized emulsion of molasses and an oil containing vitamins A and D of high potency, the molasses constituting the continuous phase to coat and enclose small globules of the oil to promote stability of the emulsion and of the vitamins contained in the emulsion.

6. A vitamin product comprising essentially fish oil concentrate containing vitamins A and D of high potency, said concentrate being emulsified in the form of minute globules in the dispersed phase in blackstrap molasses containing gums, the gums being capable of stabilizing the emulsion, said molasses being in the continuous phase and acting to coat and protect minute globules of the vitamin oil from oxidation, the emulsion being adapted also for admixture with base feeds for livestock and poultry.

7. A method of making an emulsion containing a fish oil vitamin concentrate and blackstrap molasses comprising mixing a concentrate containing vitamins A and D with blackstrap molasses containing an emulsion stabilizing gum, subjecting the mixture to thorough agitation with the exclusion of air to place the vitamin oil in a dispersed phase and the molasses in a continuous phase, then homogenizing the mixture to break up the oil into minute globules and to further stabilize the emulsion.

8. The method of making a stable vitamin composition which comprises forming an emulsion of molasses and oil rich in vitamins A and D, then mixing the said emulsion with an additional quantity of molasses, the emulsifying step being carried out with the exclusion of air.

9. A vitamin composition comprising an oily material containing vitamins A and D, emulsified in molasses.

10. A composition of matter comprising fat-soluble vitamins of fish liver oil emulsified in molasses.

11. A composition of matter comprising cod liver oil vitamins emulsified in molasses.

12. A vitamin composition comprising an oily material containing vitamin A emulsified in molasses.

13. A vitamin composition comprising an oily material containing vitamin D emulsified in molasses.

GEORGE HENRY LUBARSKY.